Patented Aug. 24, 1943

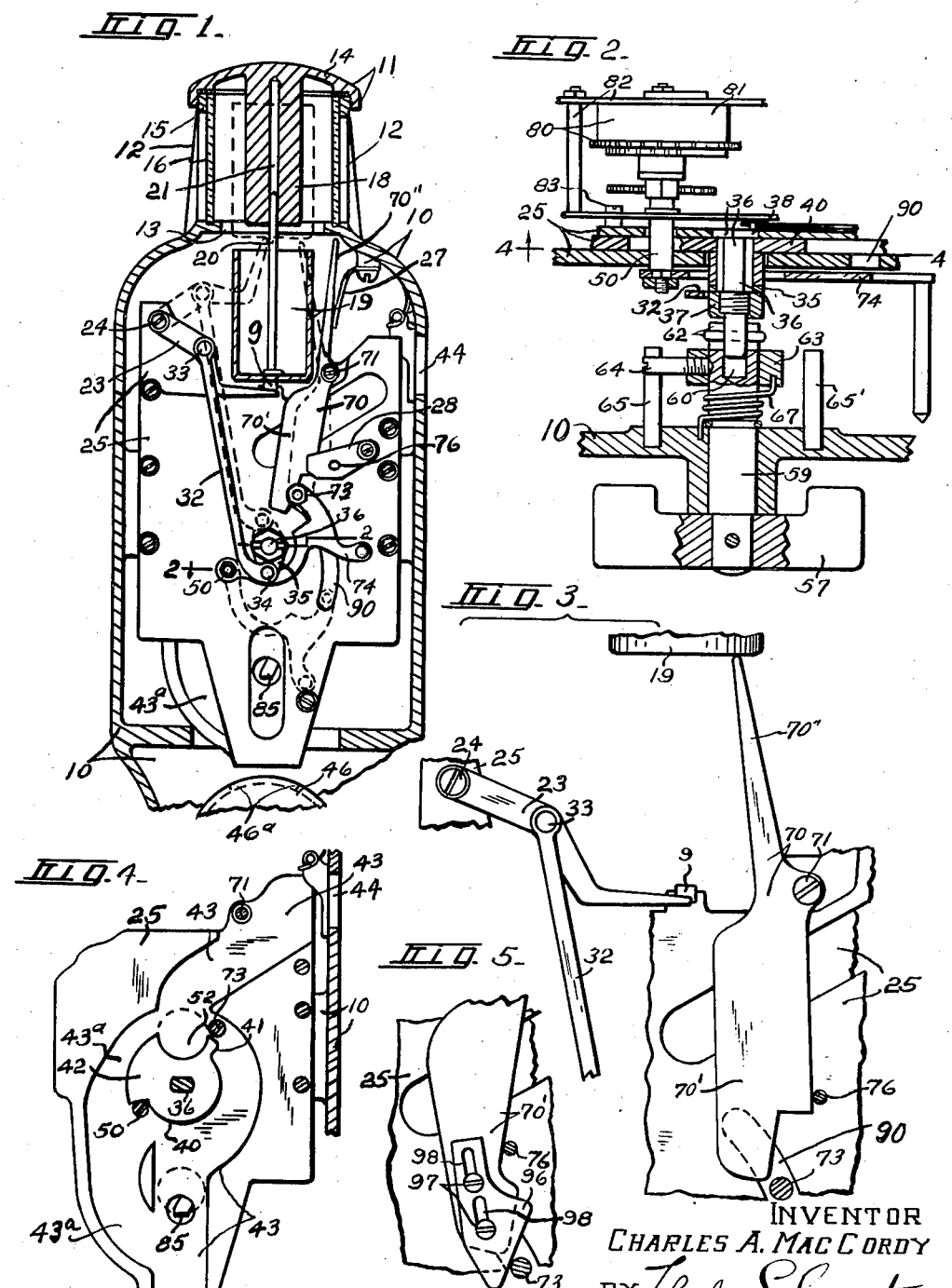

2,327,538

UNITED STATES PATENT OFFICE 2,327,538

PARKING METER

Charles A. MacCordy, Fulton, N. Y.

Application October 5, 1942, Serial No. 460,761

8 Claims. (Cl. 194—83)

The invention relates to improvements in parking meters.

The principal objects of the invention are to provide a parking meter which is simple and rugged in construction, efficient in operation, and having a minimum liability of being placed out of working order by careless or malicious turning of its control handle.

Another object of the invention is to simplify and improve the parking meter disclosed in my application for United States Letters Patent filed February 27, 1941 and serially numbered 380,939.

These and other objects and advantages of the invention will more fully appear from the following description taken in conjunction with the accompanying drawing in which:

Figure 1 is a fragmentary vertical sectional view of a parking meter embodying the invention, a portion of the mechanism within the meter casing being shown in section and another portion in elevation.

Figure 2 is an enlarged detail sectional view taken substantially on line 2—2 of Figure 1.

Figure 3 is an enlarged detail elevation of a portion of the mechanism shown in Figure 1, illustrating the movable or legal parking signal latched in its visible or signaling position.

Figure 4 is a detail vertical sectional view taken substantially on line 4—4 of Figure 2.

Figure 5 is a view similar to Figure 3 illustrating a modified form of latching member for the movable legal parking signal.

Only so much of the meter is shown as is necessary for an understanding of the present invention.

The casing 10 of the meter is adapted as is usual for attachment at its lower end, not shown, to the upper end of a suitable stationary post or standard. At its upper end the casing has a dome portion 11 comprising a pair of diametrically opposed posts 12, a circular ring 15 fixedly connected with the upper ends of the posts 12, a cylindrical window 16 of glass or other transparent material, and a dome cap 14 threaded to ring 15 to hold the window 16 to the casing. A circular aperture 13 affords access between the lower end of the dome 11 and the main body portion of the casing 10, and the cap 14 is formed axially thereof with a pendant cylindrical stationary signal element 18 which extends downward preferably to aperture 13. This signal is normally visible from all directions around the meter and, when visible, indicates that the adjoining parking space has not been preempted by payment of the legal fee.

A normally invisible legal parking signal element 19 is mounted within the casing below dome 11 for movement up through aperture 13 into the dome to a signaling position indicated in dotted lines in Figure 1 in which signal 19 surrounds and conceals from view the stationary signal 18. Signal 19 is cylindrical and has an open upper end and a closed bottom. A guide rod 20 fixed to the bottom of signal 19 axially of the signal is constantly slidably engaged in the axial bore 21 of signal 18. The peripheral surface of signal 18 is of a contrasting color to that of signal 19, the periphery of signal 18 being preferably colored red and that of signal 19 being preferably colored green. Signal 19 is normally seated on and supported by a rubber or other suitable cushion or pad 9 held to a frame 25 fixedly mounted within the casing 10 below aperture 13.

The following spring-returned manually operable means is provided for lifting signal 19 to signaling position. A lifting arm 23 pivoted at one end thereof at 24 to frame 25 has its free end extending under and normally spaced slightly from the bottom of signal 19. A link 32 is pivoted at its upper end at 33 to arm 23 intermediate the ends of the arm and is pivoted at its lower end at 34 to a rock arm 35 fixed on a stub shaft 36. Normally arm 35 extends downward from shaft 36 which is journaled in frame 25. Shaft 36 is conversely rotative through approximately 180 degrees by means of a handle 57 located exteriorly of the casing 10. Handle 57 is fixed on a shaft 59 journaled in and extending through a wall of the casing. Shaft 59 has a socket 60 receiving one end of shaft 36. The socket portion of shaft 59 has a pin-and-slot driving connection 62 with shaft 36, a pin extending diametrically through shaft 36 being engaged in a slot extending diametrically across shaft 59 at the mouth end of socket 60. Rotation of shafts 36 and 59 is limited to approximately 180 degrees by engagement of a pin 64, fixed to shaft 59 and a shaft collar 63, with one or the other of two stop pins 65—65′ fixed to a wall of casing 10. A return spring 67, coiled about shaft 59 and anchored at its opposite ends to the casing and collar 63, normally rotatively urges the shafts and handle 57 counterclockwise as the meter is viewed in Figures 1 and 4 to urge pin 64 against stop pin 65.

Handle 57 is free at all times to be manually rotated clockwise in opposition to spring 67 until pin 64 engages pin 65′ and to be returned to normal position by said spring. If the handle is turned and released without inserting the proper coin in the meter, the signal 19 will immediately drop back to its normal concealed position.

Signal 19 is adapted to be latched in signaling position by means of a latch lever 70 pivoted at 71 on frame 25. This lever has an upper arm 70'', the upper end of which is movable under the bottom of signal 19 to latch or prop up said signal in its signaling position, the maximum throw of arm 23 being sufficient to lift signal 19 slightly above signaling position and high enough to permit free movement of the upper end of lever arm 70'' under the bottom of the signal. Latch lever 70 is constantly biased to move to latching position by an enlarged or weighted lower arm 70' of the lever, and also preferably by a leaf spring 27, one end of which is anchored to casing 10 and the other end of which presses against lever arm 70'' to urge said arm toward the signal 19. Preferably the lower arm 70' of lever 70 is guided between frame 25 and a guide block or plate 28 held to said frame, and said lever is arrested in signal latching position by a pin 76 held to said frame and guide block.

The latch lever or prop 70 is normally held out of latching position by a pin 73 fixed on a clockwork driven arm 74 which is fixed to shaft 50. Arm 74 is normally driven by the clockwork mechanism in counterclockwise direction (as the meter is viewed in Figure 1) to a position in which pin 73 has engaged lever arm 70' and rocked the lever to the position shown in Figure 1, at which time further rotation of arm 74 by the clockwork is arrested by engagement of the pin with the upper end of a slot 80 in a part of frame 25. Slot 80 is concentric with the axis of rotation of arm 74. The clockwork mechanism 80 is of conventional construction, and said mechanism and a shaft 50 driven thereby, are mounted in a frame 82 held by screws 83 to frame 25. The clockwork mechanism includes the usual clock escapement controlled spring motor 81. When arm 74 is swung clockwise as viewed in Figure 1 from the position shown in full lines to that shown in dotted lines, it will be slowly driven back to normal position by the clockwork mechanism. The throw of the arm 74 is regulated in accordance with the desired legal parking period.

Fixed on the shaft 36 within the frame 25 is a conversely rotative coin carrier or driving disk 40 having two projections or peripheral enlargements 41 and 42, the outer peripheral edges of which are concentric with the axis of the disk and which projections define therebetween a segmental coin receiving and driving notch or socket 52, the edge of which fits about half way about the periphery of the predetermined legal parking coin.

A coin slot or chute 43 formed in frame 25 leads downward from a coin slot 44 in casing 10 to the coin carrier above the axis of the carrier and thence around the periphery of the carrier at the right of the carrier to a point below the axis of the carrier and thence vertically downward to a point opposite a coin receiving slot 46ª in a coin receptacle 46. Receptacle 46 is mounted within the lower part of casing 10 preferably in the manner shown in my aforesaid prior application for United States patent. A by-pass coin chute or slot 43ª in frame 25 curves around the carrier toward the left as viewed in Figure 4 as shown and rejoins the main chute below a suitable known carrier releasable coin detent 85, which as is common in the art, normally projects into the coin chute to arrest a coin and is temporarily moved out of the chute by suitable means when a new coin is inserted in the meter and the control handle is actuated.

The notch 52 in the coin carrier 40 normally faces upwardly and is normally located just to the right as viewed in Figure 4 of the point of juncture of the upper end of the by-pass chute portion with the main chute. The pin 73 on arm 74 projects into the main chute where the latter curves around the carrier and is normally located immediately to the right (as viewed in Figure 4) of the notch 52 in the normal position of the operating handle 57 and carrier 40. In the normal position of the parts the carrier projections 41 and 42 block passage of coins past the carrier. When the carrier is rotated 180 degrees by handle 57 a coin in notch 52 will be discharged into the lower vertical portion of the main chute 43 and any surplus coin or coins in the upper portion of the main chute will pass down through by-pass chute portion 43ª and be discharged into the lower end portion of the main chute below detent 85. In the present meter, handle 57 is always free to be manipulated, there being no coin-releasable latch for preventing such turning and hence no possibility of deranging operation of the meter by breaking of such a latch by careless or malicious manipulation of the handle when no coin has been inserted in the meter.

In Figure 5 a slightly modified form of latch lever 70 is shown providing means whereby the legal parking period may be readily varied. In this construction the lower arm 70' of lever 70 is provided with an adjustable element 96 having an inclined edge for contacting the pin 73 on arm 74. Element 96 is adjustably clamped to lever arm 70' by clamping screws 97 passing through slots 98 in said element and threaded into the lever arm. By adjusting the element 96 up or down on arm 70', the parking period or the time the signal 19 will remain latched up may be varied.

The operation of the meter may be briefly summarized as follows:

The proper coin is inserted into the meter through slot 44 and passes down chute 43 until it comes to rest in notch 52 in the carrier disk 40, as shown in dotted lines in Figure 4. Handle 57 is then turned clockwise, whereupon the coin carrier will be rotated approximately 180 degrees and the coin will drive pin 73 in a path eccentric to the axis of the carrier into the position shown in dotted lines in Figure 1, and thereafter pass said pin and pass into the lower vertical part of the chute where it will be detained by detent 85 out of engagement with carrier 40 until the detent is released in the known manner. The 180 degree clockwise turning of the handle also correspondingly rotates shaft 36 to swing arm 23 upward to lift signal 19 into the position shown in dotted lines in Figure 1. During a slight initial portion of the coin-driven movement of pin 73, said pin releases the latch lever 70 which swings toward its signal latching position shown in dotted lines in Figure 1. When the handle is released and spring-returned, the signal lifting means returns to normal position and signal 19 lowers slightly until it seats in signaling position on the upper end of lever 70. Thereafter the clockwork drives arm 74 and pin 73 slowly back to normal position, said pin during a slight final portion of said clock-driven movement thereof engaging lever 70 and rocking it to signal unlatching position, whereupon signal 19 drops by gravity from signaling position to concealed position, coming to rest on the cushion block 9. If handle 57 is turned without inserting a coin, signal 19 will be lifted but will immediately drop when the handle is released.

I claim:

1. In a parking meter having a casing and a signal pendently and stationarily mounted in the casing, said casing including means through which said stationarily mounted signal is normally visible substantially entirely around the meter, the combination of a cup-shaped vertically shiftable legal parking signal adapted to substantially entirely enclose the stationarily mounted signal and slidably connected with the latter, stationary supporting means in the casing upon which the legal parking signal is normally seated to support said signal in an invisible position in the casing, a shiftable supporting member in the casing constantly biased to move to a position for supporting the legal parking signal in an elevated visible signaling position in which it substantially entirely conceals the stationarily supported signal, a clockwork driven member engageable with the shiftable supporting member and normally urged to a position in which it holds said supporting member out of supporting engagement with the legal parking signal, manually operable spring-returned thrust means contactive with the legal parking signal to lift it for support thereof by said shiftable supporting member and spring return of said means independently of the lifted signal, and coin driving means in the casing operable by signal lifting manual movement of said manually operable means to cause a driven coin to drive said clockwork driven member reversely a predetermined distance out of contact with the shiftable supporting member and then discharge the driven coin from said coin driving means.

2. In a parking meter, a casing including a portion for exposing a legal parking signal, a legal parking signal, fixed supporting means in the casing normally supporting said signal in a concealed position below said signal exposing portion of the casing, means for guiding said signal to move up and down for exposure and concealment thereof, a thrust member contactive with said signal to move it upwardly to exposed signaling position, spring-returned manually operable actuating means positively connected with said thrust member to actuate the latter and including an operating handle located exteriorly of the casing, said actuating means being constantly free for manual actuation and spring return thereof, a movable signal support mounted in said casing and constantly biased for movement thereof into a position to support the legal parking signal in exposed position following lifting thereof by the thrust member, a coin driver reversely movable by said actuating means to drive and discharge therefrom on the handle operated stroke of the actuating means a coin inserted in the meter, an oppositely movable member mounted in the casing, and means for constantly urging said oppositely movable member in one direction at a regulated speed into a position in which it engages and holds the movable signal support out of signal supporting position, said movable member being movable in the opposite direction by a coin driven by said driver to free the movable signal support from contact therewith for a predetermined time interval.

3. A parking meter comprising a casing having means through which a legal parking signal is exposable to view, a legal parking signal guided for movement within the casing from a normal concealed position to an elevated exposed signaling position, means to support the signal in concealed position, spring-returned manually operable means including a thrust member contactive with the signal to elevate it to exposed signaling position, a signal latch biased to automatically engage and latch the signal in signaling position, and coin-controlled releasing mechanism for said latch normally holding said latch in released position and including means for permitting said latch to assume latching position for a predetermined legal parking period upon manual actuation of said spring-returned signal elevating means following delivery of a predetermined coin to said coin-controlled mechanism.

4. A parking meter, as claimed in claim 3, wherein the coin-controlled latch releasing mechanism comprises a coin driving disk conversely rotative about a horizontal axis through substantially one half of a revolution by the manually operable spring-returned means, means affording a coin chute extending downward in the meter and having branches joining above and below the axis of the disk and passing around the periphery of the disk, said disk having two peripheral projections for partial insertion of a coin therebetween for driving of the coin and each blocking a different one of said branches at the upper juncture thereof in the normal position of the manually operable means, a latch releasing member drivable along one of said branches by a driven coin about an axis eccentric to that of said disk out of engagement with the latch until said coin passes said member and is discharged from the disk into said branch, and a clockwork mechanism for automatically reversely driving said member to release the latch, the projection blocking the other branch of the chute being movable to clear said branch by the manually operated stroke of the spring-returned means to permit surplus coins to by-pass the coin driving disk.

5. In a parking meter, a casing, a legal parking signal movable upwardly from a concealed position within the casing to an exposed position, means to support said signal in concealed position, a latch to engage the signal to hold it in exposed position and constantly biased toward latching position, handle operated spring-returned means adapted for thrusting said signal to position for latching thereof and to return to a normal idle position, a latch releasing member, a coin driving member, said members being conversely rotative through a portion of a revolution about parallel axes, the coin driving member being positively rotative by said handle operated means at all times and adapted to be coupled by a coin to said latch releasing member to drive the same in one direction out of contact with the latch until the driven coin is free to pass the latch releasing member and then to discharge the coin, and a clockwork mechanism constantly tending to drive the latch releasing member to latch releasing position.

6. A parking meter, as claimed in claim 5, wherein the signal latch comprises a lever pivoted to swing about a horizontal axis and having an upper arm engageable with the signal to prop the latter up in exposed position and a lower arm engageable by said latch releasing member to release the latch and normally hold it released.

7. A parking meter, as claimed in claim 5, wherein the signal latch comprises a lever pivoted to swing about a horizontal axis and having an upper arm engageable with the signal to latch the latter in exposed position and also having a lower arm, said lower arm having a contact element engageable by the latch releasing member and adjustable on said arm to vary the length of time the latch is maintainable in latching position.

8. A parking meter, as claimed in claim 5, having a fixed signal normally visible from substantially all points around the meter, and wherein the legal parking signal is formed and arranged to telescope about said fixed signal and to conceal the latter when the legal parking signal is latched in elevated position by its latch.

CHARLES A. MacCORDY.